Aug. 6, 1968 H. R. FOSTER 3,396,236
AUTOMATIC BLACK-LEVEL CONTROL CIRCUIT
Filed June 7, 1965
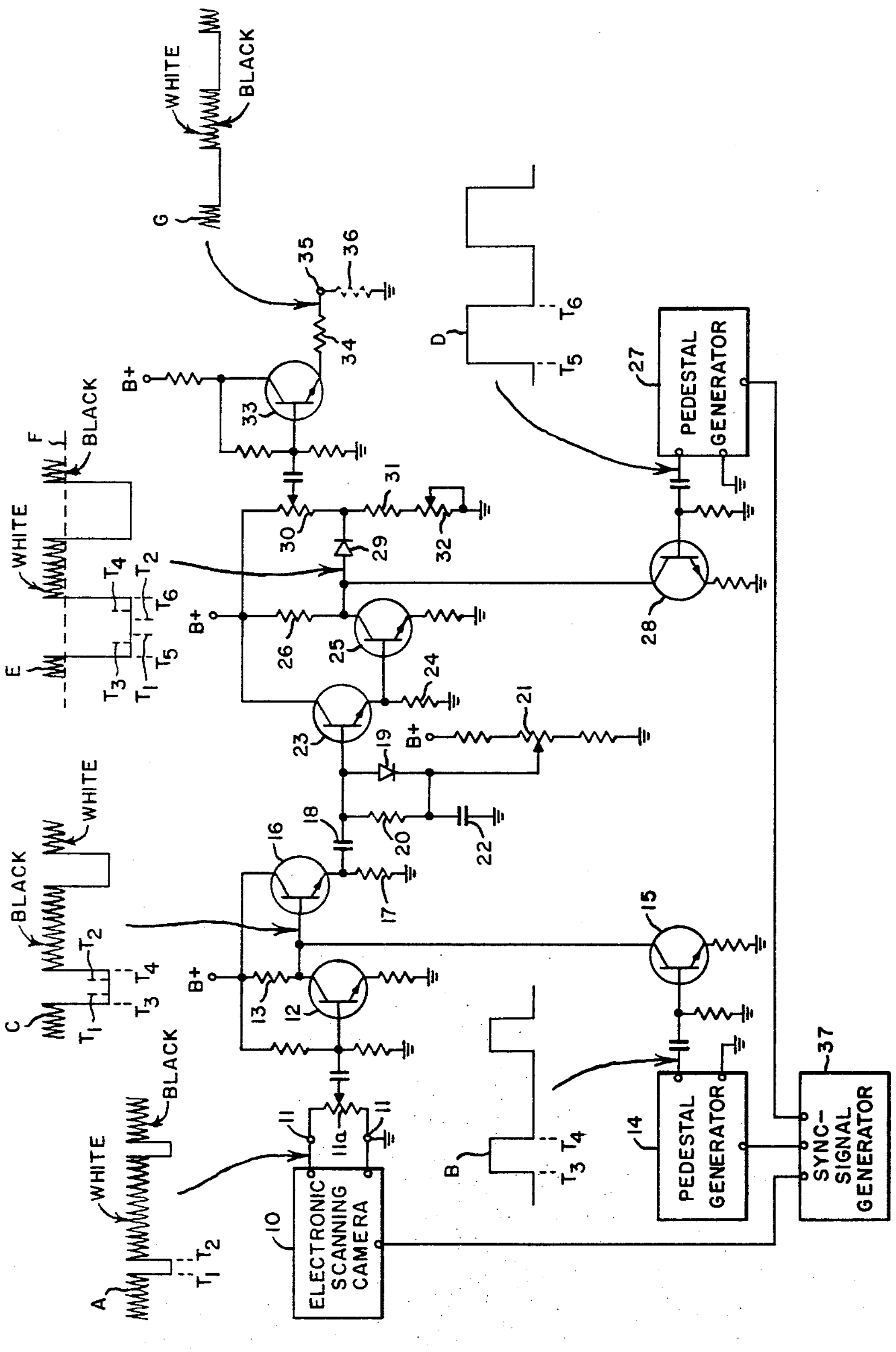

United States Patent Office 3,396,236
Patented Aug. 6, 1968

3,396,236

AUTOMATIC BLACK-LEVEL CONTROL CIRCUIT

Herbert R. Foster, New Brighton, N.Y., assignor to Fairchild Camera and Instrument Corporation, a corporation of Delaware Filed June 7, 1965, Ser. No. 461,707
6 Claims. (Cl. 178—7.1)

This invention relates to automatic black-level control circuit and particularly to such circuits for controlling the black level of the output of an electronic scanning camera developing a positive video signal. By the term "positive video signal" is meant a signal, the amplitude of which varies in the same sense as the brightness of the image being viewed so that an increase in brightness is represented by an increase in the magnitude of the video signal.

Conventional electronic scanning cameras develop a positive video signal which, for each scanning line, comprises a trace portion representative of the element-by-element brightness of the scene being viewed and a retrace portion during which the video signal is blanked out or reduced to a blacker-than-black value of substantially zero magnitude and termed the blanking interval. In viewing an outdoor scene, there is generally present more or less haze which diffuses the illumination and produces a certain amount of video signal, even when the camera is scanning a portion of the scene which is substantially black, thereby causing a loss of black reference level useful in the subsequent signal-translating stages of both the transmitter and the receiver and reducing the maximum contrast ratio of the produced signal. This minimum value of video signal is sometimes referred to as a haze pedestal.

It is an object of the invention, therefore, to provide a new and improved automatic black-level control circuit which obviates the foregoing limitations on prior electronic scanning cameras and by means of which the darkest tone in the scene being viewed is arbitrarily established as reference black.

In accordance with the invention, there is provided an automatic black-level control circuit for an electronic scanning camera developing a positive video signal comprising an input circuit for supplying a camera-developed video signal, means for inverting the polarity of an input signal, means for stabilizing the inverted signal on its peak black level, means for inverting the polarity of the stabilized signal, and an output circuit coupled to the signal-inverting means.

Further in accordance with the invention, there is provided an automatic black-level control circuit for an electronic scanning camera developing a positive video signal comprising an input circuit for supplying a camera-developed video signal, means for combining with an input signal a whiter-than-white first periodic pedestal signal, means for stabilizing the combined signal on its peak black level, means for combing with the stabilized signal a blacker-than-black second periodic pedestal signal of predetermined amplitude, each pedestal having a duration exceeding that of and embracing the first pedestal signal, means for clipping the last-named combined signal substantially at the peak black level thereof, and an output circuit coupled to the signal-clipping means. By the term "whiter-than-white" pedestal signal is meant a pedestal of the same polarity as that representing maximum white and of greater amplitude than that corresponding to full white in an image being viewed. Similarly, the term "blacker-than-black" is used to refer to an electrical signal of an amplitude greater than that representing absolute black in the scene being viewed.

For a better understanding of the present invention, together with other and further objects thereof, reference is had to the following description, taken in connection with the accompanying drawing, while its scope will be pointed out in the appended claims.

Referring now to the single figure of the drawing, there is shown a schematic circuit diagram of an automatic black-level control circuit embodying the invention.

Referring more particularly to the drawing, there is represented an automatic black-level control circuit for an electronic scanning camera 10 which develops a positive video signal having recurrent blanking pulses, as represented by wave form A. This signal is applied to an input circuit comprising terminals 11, 11 which are coupled through potentiometer 11*a* to a conventional transistor amplifier 12 having a load resistor 13 and developing across the resistor 13 an amplified signal inverted in polarity.

The black-level control circuit further comprises means for combining with the inverted input signal a whiter-than-white periodic pedestal signal represented by wave form B, each pedestal having a duration $T_3$–$T_4$ exceeding the blanking interval $T_1$–$T_2$ of the input signal A and embracing that blanking interval. This last means may be in the form of a pedestal generator 14 for generating the wave form B and coupled through a conventional transistor amplifier 15 which inverts the wave form B, the collector of transistor 15 being connected in parallel with the collector of transistor 12 and having a common load resistor 13. The combined inverted signal is represented by wave form C, in which the blanking interval of wave form A is shown in dotted lines.

The circuit further comprises means for stabilizing the combined inverted signal of wave form C on its peak black level. This means comprises an emitter-follower transistor 16 having an emitter-load resistor 17 coupled through a capacitor 18 to a D.C. restoring or clamping circuit comprising a diode rectifier 19 in parallel with a resistor 20, the cathode of the diode 19 being connected to an adjustable tap of a voltage-divider 21 connected between a source B+ and ground. A bypass capacitor 22 is connected in parallel with the portion of the voltage-divider 21 included in the D.C. restoring circuit.

The black-level control circuit of the invention further comprises signal repeater means for inverting the stabilized combined signal, this means being in the form of an emitter-follower transistor 23 having its base connected to the D.C. restoring circuit just described and provided with an emitter-load resistor 24 which is coupled to a transistor amplifier 25 having a load resistor 26.

The black-level control circuit further comprises means for combining with the stabilized inverted signal a blacker-than-black periodic pedestal signal represented by wave form D of predetermined amplitude, each pedestal having a duration $T_5$–$T_6$ exceeding that of the pedestal of wave form B, $T_3$–$T_4$, and phased to embrace the latter. This latter means may comprise a pedestal generator 27 for generating a periodic pedestal of wave form D coupled to a transistor amplifier 28, the collector of which is connected in parallel with the collector of transistor 25 and having the common load resistor 26.

The inverted signal of wave form C, combined with pedestal wave D, is represented by wave form E with the blanking interval of wave form A and the pedestal of wave form C being shown in dotted lines. The amplitude of the pedestal D is such that the pedestal B always falls below the greatest excursion of the video signal E in the black direction.

The black-level control circuit of the invention further comprises means for clipping the signal of wave form E substantially at its black level. This may be effected by means of a diode clipper 29 connected between the common collector connection of the transistors 25 and 28 and a point of a voltage-divider comprising resistors 30, 31, and 32, the latter being provided with an adjustable tap for adjusting the clipping level of signal E. The signal E is supplied from an adjustable tap on resistor 30 to an impedance-transforming signal repeater such as an emitter-follower transistor 33 provided with an emitter-load resistor 34 connected to an output terminal 35 and adapted to be connected in series with a load resistance 36 which may represent the characteristic impedance of a coaxial line.

The pedestal generators 14 and 27 may be maintained in synchronism and phase with the scanning camera 10 by means of a sync-signal generator 37 common to the three units.

It is believed that the operation of the black-level control circuit of the invention will be apparent from the foregoing description. In brief, a conventional positive video signal of wave form A developed by the camera 10 is amplified and inverted in the transistor 12 so that the black level and white level are transposed, as represented in wave form C. To this amplified inverted signal is applied the pedestal of wave form B inverted in polarity, this pedestal having a time duration greater than the blanking intervals of the input signal A and an amplitude greater than the minimum black component of that signal so that the blanking intervals are completely suppressed from the signal of wave form C.

This combined and inverted signal is then applied to the stabilizing or clamping circuit including the diode 19 so that it becomes stabilized on the peak value of the black signal. That peak value is arbitrarily then established as the black reference level of the signal in the subsequent stages of the circuit. The stabilized signal of wave form C is then combined by means of transistors 25 and 28 with the pedestal of wave form D inverted in polarity and having a time duration $T_5$–$T_6$ greater than that of the pedestal B and also of greater amplitude.

Therefore, in the combined signal represented by wave form E, the pedestal wave B is completely suppressed. The signal of wave form E is then impressed upon the diode clipper 29 which is provided with a bias adjustable by means of adjustable resistor 32 to a value corresponding to the blackest component of the video signal of wave form E. The diode 29 thus clips the pedestals inserted by wave form D along the line F, leaving only the video signal of wave form E with the black level corresponding to zero amplitude, that is, to absolute black. The video signal of wave form E is then further amplified in the impedance-transforming emitter-follower transistor 33 and applied to the output terminal 35 with the wave form represented by wave form G.

With the arrangement described, the output signal of wave form G always has a minimum value corresponding to absolute black, irrespective of the haze pedestal introduced into the input signal of wave form A.

While there has been described what is, at present, considered to be the preferred embodiment of the invention, it will be obvious to those skilled in the art that various changes and modifications may be made therein, without departing from the invention, and it is therefore, aimed in the appended claims to cover all such changes and modifications as fall within the true spirit and scope of the invention.

What is claimed is:

1. An automatic black-level control circuit for an electronic scanning camera developing a positive video signal comprising:

an input circuit for supplying a camera-developed video signal;
means for inverting the polarity of an input signal;
means for stabilizing the inverted signal on its peak black level;
means for inverting the polarity of the stabilized signal;
and an output circuit coupled to said inverting means.

2. An automatic black-level control circuit for an electronic scanning camera developing a positive video signal comprising:

an input circuit for supplying a camera-developed video signal;
means for combining with an input signal a whiter-than-white first periodic pedestal signal;
means for stabilizing the combined signal on its peak black level;
means for combining with said stabilized signal a blacker-than-black second periodic pedestal signal of predetermined amplitude, each pedestal having a duration exceeding that of and embracing said first pedestal signal;
means for clipping said last-named combined signal substantially at the peak black level thereof;
and an output circuit coupled to said signal-clipping means.

3. An automatic black-level control circuit for an electronic scanning camera developing a positive video signal having recurring blanking intervals comprising:

an input circuit for supplying a camera-developed video signal;
means for combining with an input signal a whiter-than-white first periodic pedestal signal, each pedestal having a duration exceeding that of and embracing a blanking interval;
means for stabilizing the combined signal on its peak black level;
means for combining with said stabilized signal a blacker-than-black second periodic pedestal signal of predetermined amplitude, each pedestal having a duration exceeding that of and embracing said first pedestal signal;
means for clipping said last-named combined signal substantially at the peak black level thereof;
and an output circuit coupled to said signal-clipping means.

4. An automatic bltck-level control circuit for an electronic scanning camera developing a positive video signal comprising:

an input circuit for supplying a camera-developed video signal;
means for combining with an input signal a whiter-than-white first periodic pedestal signal;
means for inverting the polarity of the combined signal;
means for stabilizing the inverted signal on its peak black level;
means for inverting the stabilized signal;
means for combining with said last-named signal a blacker-than-black second periodic pedestal signal of predetermined amplitude, each pedestal having a duration exceeding that of and embracing said first pedestal signal;
means for clipping said last-named combined signal substantially at the peak black level thereof;
and an output circuit coupled to said signal-clipping means.

5. An automatic black-level control circuit for an electronic scanning camera developing a positive video signal comprising:

an input circuit for supplying a camera-developed video signal;
means for combining with an input signal a whiter-than-white first periodic pedestal signal;
means for stabilizing the combined signal on its peak black level;
a signal repeater for combining with said stabilized signal a blacker-than-black second periodic pedestal signal of predetermined amplitude, each pedestal having a duration exceeding that of and embracing said first pedestal signal;
a diode clipper coupled to said repeater and having an adjustable bias for clipping said last-named combined signal substantially at the peak black level thereof;

and an output circuit coupled to said diode clipper.

6. An automatic black-level control circuit for an electronic scanning camera developing a positive video signal comprising:

an input circuit for supplying a camera-developed video signal;

means for combining with an input signal a whiter-than-white first periodic pedestal signal;

means for a stabilizing the combined signal on its peak black level;

means for combining with said stabilized signal a blacker-than-black second periodic pedestal signal of predetermined amplitude, each pedestal having a duration exceeding that of and embracing said first pedestal signal;

means for clipping said last-named combined signal substantially at the peak black level thereof;

an impedance-transforming signal repeater coupled to said clipping means;

and an output circuit coupled to said signal repeaer.

References Cited

UNITED STATES PATENTS 2,173,497 9/1939 Schlesinger --------- 178—7.1

ROBERT L. GRIFFIN, *Primary Examiner.*

R. L. RICHARDSON, *Assistant Examiner.*